United States Patent
Horie (10) Patent No.: US 6,663,522 B2
(45) Date of Patent: Dec. 16, 2003

(54) RANDOM ARRANGEMENT TYPE SILENT CHAIN

(75) Inventor: Hiroshi Horie, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 15 days.

(21) Appl. No.: 10/080,990

(22) Filed: Feb. 22, 2002

(65) Prior Publication Data

US 2002/0119853 A1 Aug. 29, 2002

(30) Foreign Application Priority Data

Feb. 23, 2001 (JP) .................................. 2001/048342

(51) Int. Cl.[7] ............................................... F16G 13/04
(52) U.S. Cl. ......................................... 474/212; 474/213
(58) Field of Search ............................ 474/212, 213, 474/206, 202

(56) References Cited

U.S. PATENT DOCUMENTS

| | | | | |
|---|---|---|---|---|
| 4,342,560 A | * | 8/1982 | Ledvina et al. | 474/157 |
| 4,509,323 A | | 4/1985 | Ledvina et al. | |
| 4,509,937 A | | 4/1985 | Ledvina et al. | |
| 5,154,674 A | * | 10/1992 | Avramidis et al. | 474/214 |
| 5,372,554 A | * | 12/1994 | Okuda | 474/206 |
| 5,453,059 A | | 9/1995 | Avramidis et al. | |
| 5,628,702 A | * | 5/1997 | Kotera | 474/213 |
| 5,700,217 A | * | 12/1997 | Wakabayashi | 474/217 |
| 6,159,122 A | * | 12/2000 | Kanehira et al. | 474/212 |
| 6,387,001 B1 | * | 5/2002 | Markley | 474/202 |

FOREIGN PATENT DOCUMENTS

| | | | | |
|---|---|---|---|---|
| EP | | 92900 A2 | * 11/1983 | ........... F16G/13/04 |
| JP | Hei | 02-000437 | 1/1990 | |
| JP | | 13399 | 4/1994 | |
| JP | | 8-184348 | 7/1996 | |
| JP | | 2000-130518 | 5/2000 | |

* cited by examiner

Primary Examiner—David Fenstermacher
(74) Attorney, Agent, or Firm—Howson and Howson (57) ABSTRACT

A random arrangement type silent chain is provided, which restricts run-upon and reduces contact noise and vibration noise of the free span of the chain, and also restricts abnormal elongation and excessive load during power transmission. In the silent chain a first link plate, which begins to engage with a sprocket tooth by its inner crotch and sits on the sprocket teeth by its outer flanks, and a second link plate, which engages with and sits on the sprocket teeth only by engagement with its outer flanks, are mixed and combined in an endless chain in the longitudinal direction. The mixture ratio of the first link plates to the total link plates is less than 50%, at least one or more of the second link plates are arranged before and after each of the first link plates, and the number of second link plates arranged before and after each first link plate varies randomly along the length of the chain.

5 Claims, 8 Drawing Sheets

| LINK PLATE ARRANGEMENT ORDER | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| FIRST LINK PLATE 1 | ○ | | ○ | | ○ | | ○ | ○ | | | ○ | | ○ | | | ○ | | ○ | | | | |
| SECOND LINK PLATE 2 | | ○ | | ○ | | ○ | | | ○ | ○ | | ○ | | ○ | ○ | | ○ | | ○ | ○ | ○ | ○ |
| LINK PLATE ARRANGEMENT ORDER | 23 | 24 | 25 | 26 | 27 | 28 | 29 | 30 | 31 | 32 | 33 | 34 | 35 | 36 | 37 | 38 | 39 | 40 | 41 | 42 | 43 | 44 |
| FIRST LINK PLATE 1 | ○ | | | ○ | | ○ | | | ○ | | | ○ | | ○ | | ○ | | ○ | ○ | ○ | ○ | ○ |
| SECOND LINK PLATE 2 | | ○ | ○ | | ○ | | ○ | ○ | | ○ | ○ | | ○ | | ○ | | ○ | | | | | |
| LINK PLATE ARRANGEMENT ORDER | 45 | 46 | 47 | 48 | 49 | 50 | 51 | 52 | 53 | 54 | 55 | 56 | 57 | 58 | 59 | 60 | 61 | 62 | 63 | 64 | 65 | 66 |
| FIRST LINK PLATE 1 | ○ | | | ○ | ○ | | | ○ | | | ○ | | | ○ | | ○ | ○ | ○ | ○ | ○ | ○ | ○ |
| SECOND LINK PLATE 2 | | ○ | ○ | | | ○ | ○ | | ○ | ○ | | ○ | ○ | | ○ | | | | | | | |
| LINK PLATE ARRANGEMENT ORDER | 67 | 68 | 69 | 70 | 71 | 72 | 73 | 74 | 75 | 76 | 77 | 78 | 79 | 80 | 81 | 82 | 83 | 84 | RETURN TO (1) | | | |
| FIRST LINK PLATE 1 | ○ | | ○ | ○ | ○ | ○ | ○ | ○ | ○ | ○ | ○ | ○ | ○ | ○ | ○ | ○ | ○ | | | | | |
| SECOND LINK PLATE 2 | | ○ | | | | | | | | | | | | | | | | ○ | | | | |

TABLE 1
NOISE MEASUREMENT RESULT OF THIS EMBODIMENT AND COMPARISON EXAMPLES

|  | P1 (NUMBER) | P2 (NUMBER) | MIXTURE RATIO (%) | ORDER SOUND (dB) | OVERALL SOUND (dB) |
|---|---|---|---|---|---|
| THIS EMBODIMENT | 28 | 56 | 33 | 72.5 | 107.3 |
| COMPARATIVE EXAMPLE 1 | 84 | 0 | 100 | 85.6 | 108.4 |
| COMPARATIVE EXAMPLE 2 | 56 | 28 | 67 | 80.6 | 107.8 |
| COMPARATIVE EXAMPLE 3 | 42 | 42 | 50 | 81.9 | 107.7 |
| COMPARATIVE EXAMPLE 4 | 0 | 84 | 0 | 86.3 | 107.9 |

FIG. 9
PRIOR ART

RANDOM ARRANGEMENT TYPE SILENT CHAIN

BACKGROUND OF THE INVENTION

1. Technical Field of the Invention

This invention relates to a silent chain that includes a plate arrangement and structure to reduce the level of noise occurring when power is transmitted.

2. Prior Art

Conventionally, a silent chain, which has been widely used for transmitting power between a crankshaft and a camshaft of an automobile engine, is composed of a large number of link plates on which crotched link teeth are formed for engagement with sprocket teeth. An outer engagement surface or an inner engagement surface of the crotched link tooth contacts the sprocket tooth to effect power transmission.

Figure 9:
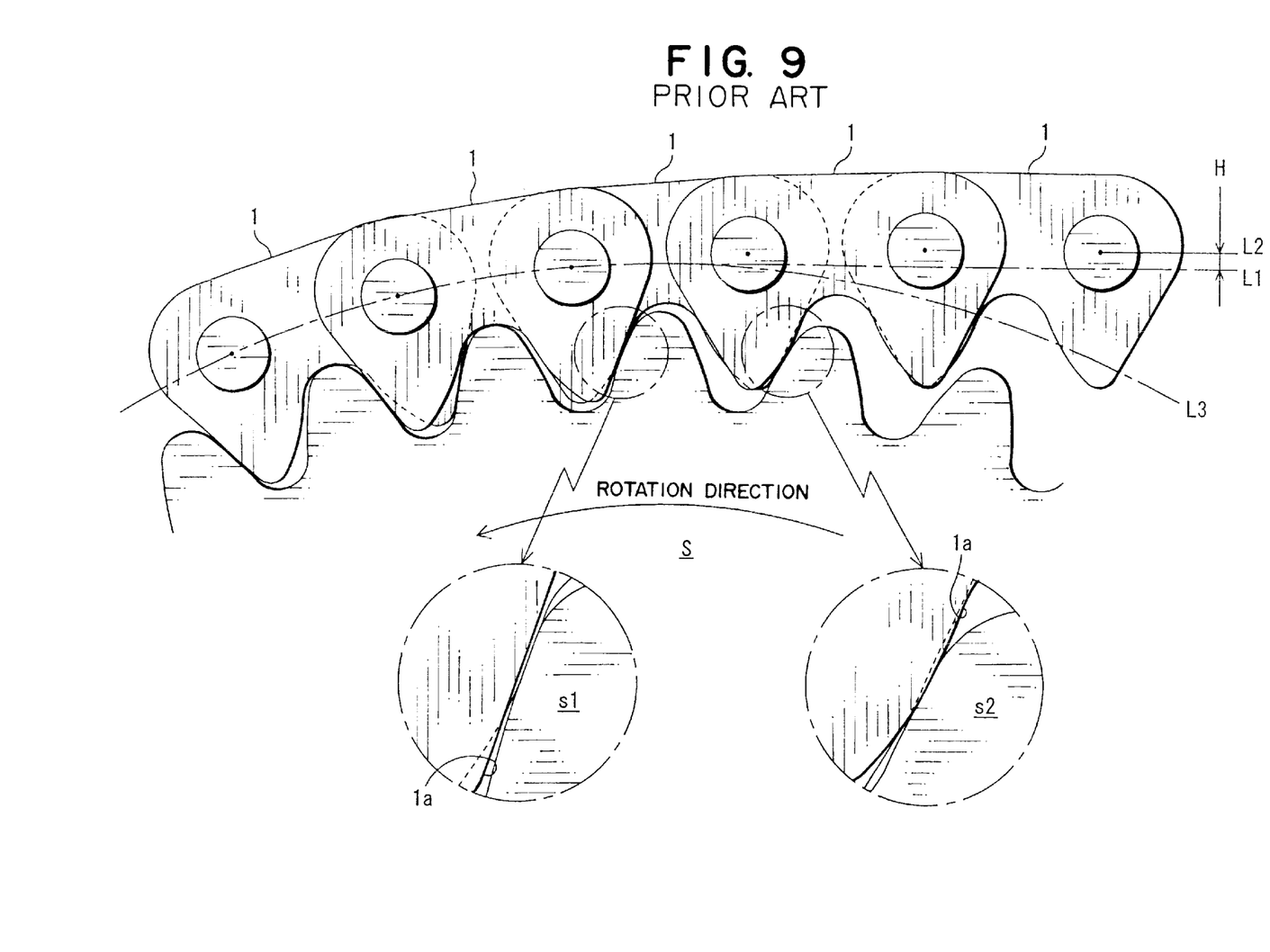
FIG. 9 is a view showing a conventional engagement pattern.

Various kinds of improvement have been made in such silent chains to reduce the level of noise occurring during power transmission. For example, the silent chain disclosed in Japanese Utility Model Publication No. 6-13399, which is also shown in FIG. 9, adopts a link plate 1 whose inner engagement surface 1a is expanded at the center in a convex shape, and an inner engagement surface 1a of the link plate 1 that begins to engage with the sprocket tooth and another inner engagement surface 1a of the link plate 1 that engages with the sprocket tooth ahead of the former engagement surface 1a are made to contact adjacent sprocket teeth (s1, s2) of the sprocket simultaneously. Thus, the chain is devised so that noise occurring during engagement of the teeth is dispersed to the adjacent sprocket teeth (s1, s2) of the sprocket, and reduced.

However, in the silent chain described in the foregoing Japanese Utility Model Publication No. 6-13399, silent chain tension during power transmission and the tooth shape of the inner engagement surface 1a expanded in a convex shape cause excessive frictional force that interferes with smooth sliding contact between the inner engagement surface 1a of the link plate 1 and the sprocket teeth (s1, s2). Then, the inner engagement surface 1a of the link plate 1 is caught by head portions of the sprocket teeth (s1, s2) to produce contact noise due to the frictional force, and a so-called "run-upon" phenomenon, where the link plate 1 runs upon the head portions of the sprocket teeth (s1, s2), occurs as shown in FIG. 9.

The engagement line of the silent chain in which the run-upon phenomenon has occurred is displaced from the sprocket pitch circle L3, to which an ideal engagement line L1 is tangent, by a run-upon width H in the head portion direction of the sprocket tooth in the case where the silent chain smoothly approaches the sprocket S to engage and sit thereon. The run-upon width H is still larger if the inner engagement surfaces 1a of a plurality of the link plates 1 engage with a plurality of corresponding sprocket teeth (s1, s2, and so on) continuously and simultaneously. Accordingly, the traveling line L2 in the free span of the chain floats, causing too much play, such as play in the nature of string vibration, which remarkably amplifies vibration noise.

Therefore, the conventional silent chain having a link plate 1 whose inner engagement surface 1a is expanded at the center in a convex shape has a problem that the contact noise of the inner engagement surface 1a occurring as a result of the foregoing run-upon phenomenon, and the vibration noise of the free span, interfere with the noise dispersion effect resulting from the simultaneous contact of plural inner engagement surfaces 1a, and thus the noise dispersion effect is diminished. Furthermore, there has existed the problem that the run-upon phenomenon produced abnormal elongation and a large load on the link plate 1, shortening the life of the silent chain remarkably.

SUMMARY OF THE INVENTION

The object of this invention is to solve the foregoing problems of the prior art, to provide a silent chain capable of reducing the contact noise of the inner engagement surface and the vibration noise of the free span by restricting the run-upon phenomenon and to extend the life of the silent chain life by restricting abnormal elongation and excessive load during power transmission.

A random arrangement type silent chain of the invention is one in which a first link plate, which begins to engage with the sprocket tooth by engagement with an inner crotch, and sits on the sprocket teeth by engagement with its outer flanks, and a second link plate, which engages with and sits on the sprocket teeth only by engagement with its outer flanks, are mixed and combined in the longitudinal direction to form an endless chain. The foregoing problems are solved by setting the mixture ratio of the first link plates to the total link plates to less than 50%, by arranging at least one or more of the second link plates before and after each of the first link plates, and by varying the number of second link plates arranged before and after each first link plate randomly along the length of the chain.

The term "inner crotch" as used herein refers to the inner engagement surface of the crotched link teeth formed on the link plate engaging with the sprocket tooth, and the term "outer flank" refers to the outer engagement surface of the crotched link tooth.

The tooth surface shape of the inner crotch of the first link plate may be a curved shape that swells out a little when superposed on the outer flank (described later) of the second link plate, an arcuate shape or a shape in which these shapes are combined, as long as the tooth surface has a shape in which the tooth can begin engagement with the sprocket tooth by its inner crotch. Further, the tooth surface on the outside may be of a linear shape, a curved shape or a shape in which these shapes are combined, as long as the tooth surface has a shape in which the tooth sits on the sprocket tooth while sliding smoothly and avoiding striking noise.

Further, the tooth surface of the inner crotch of the second link plate may be of a linear shape, a curved shape, an arcuate shape, or a shape in which these shapes are combined, as long as the tooth surface has a shape in which the inner crotch is not allowed to engage with the sprocket tooth, and the outside tooth surface may be of a linear shape, a curved shape or a shape in which these shapes are combined, as long as the tooth surface has a shape in which the tooth sits on the sprocket teeth only by contact with its outer flanks while sliding smoothly and avoiding striking noise.

Moreover, the first link plate and the second link plate, adopted in the random arrangement type silent chain of the invention, may be either a link plate including pin holes for inserting connection pins, or a link plate into which bushings for inserting the connection pins are fitted. Further, the connection pins that combine the link plates into an endless chain may be either round pins having a circular cross-section, or rocker joint type pins in which rolling back surfaces of a rocker pin and a joint pin face with each other.

A sprocket, with which the random arrangement type silent chain of the invention engages, is a regular sprocket including a large number of uniform sprocket teeth, but a sprocket including sprocket teeth whose head portions are dropped out may also be used because it does not cause the run-upon phenomenon.

According to the random arrangement type silent chain of the invention, by setting the mixture ratio of the first link plates to the total link plates to less than 50%, and by randomly arranging at least one or more of the second link plates before and after the first link plates, the inner crotch of the first link plate does not engage with the sprocket teeth continuously and simultaneously even if any link plate in the longitudinal direction engages with the sprocket to cause an engagement pattern due to an arrangement mode of the link plates during power transmission, and thus the conventional run-upon phenomenon is restricted.

PREFERRED EMBODIMENTS OF THE INVENTION

One embodiment of the invention will be described in detail as follows with reference to the drawings.

Figure 1:
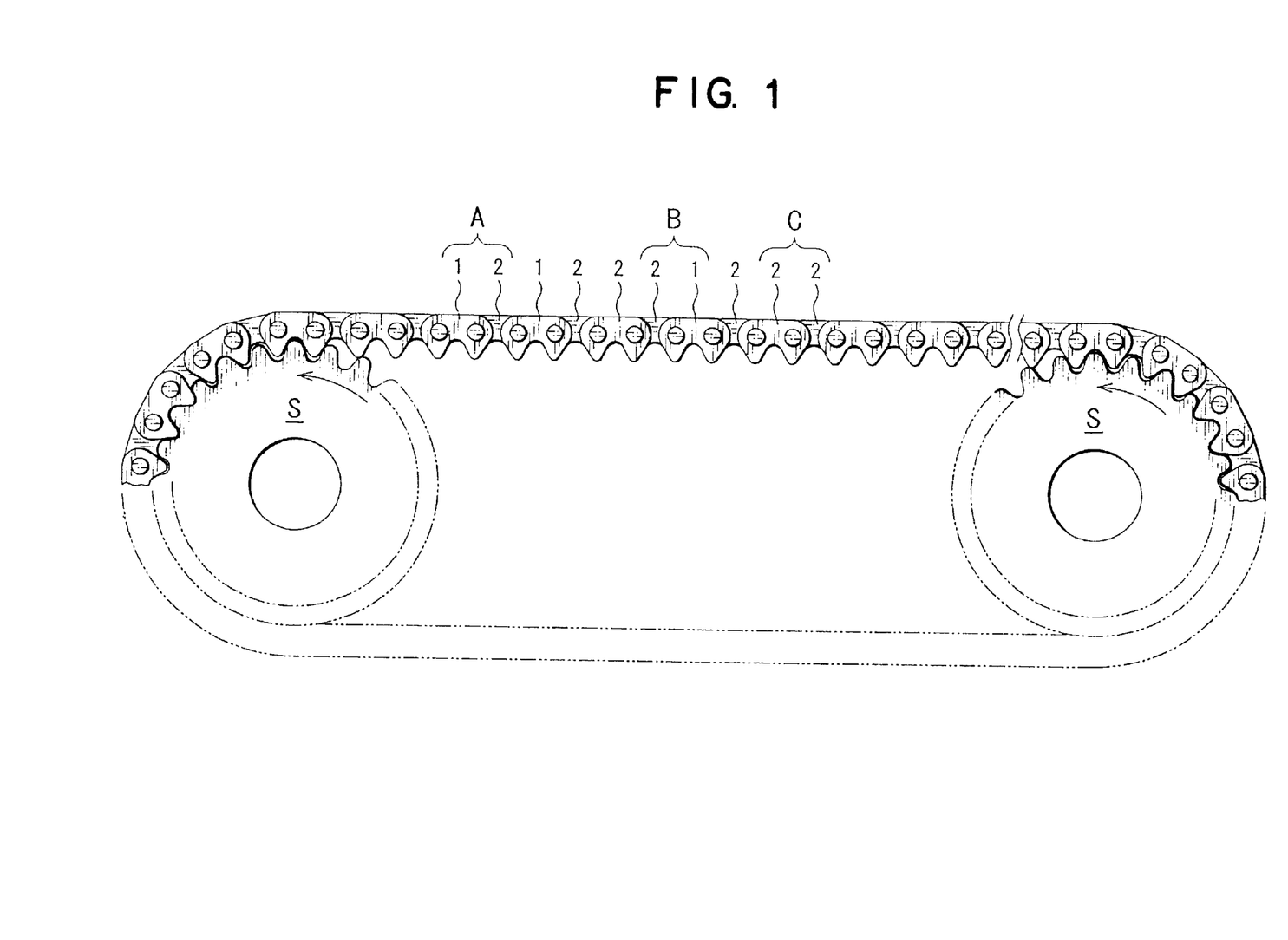
FIG. 1 is an elevational view of a complete random arrangement type silent chain in accordance with an embodiment of the invention, the chain spanning a pair of sprockets.
Figure 2:
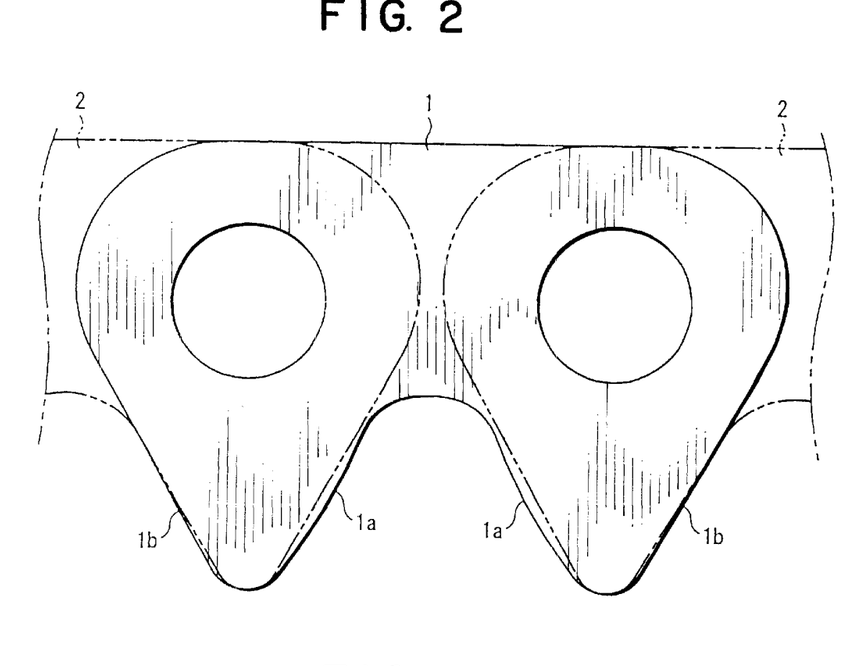
FIG. 2 is an enlarged view of a first link plate used in embodiment of FIG. 1.
Figure 3:
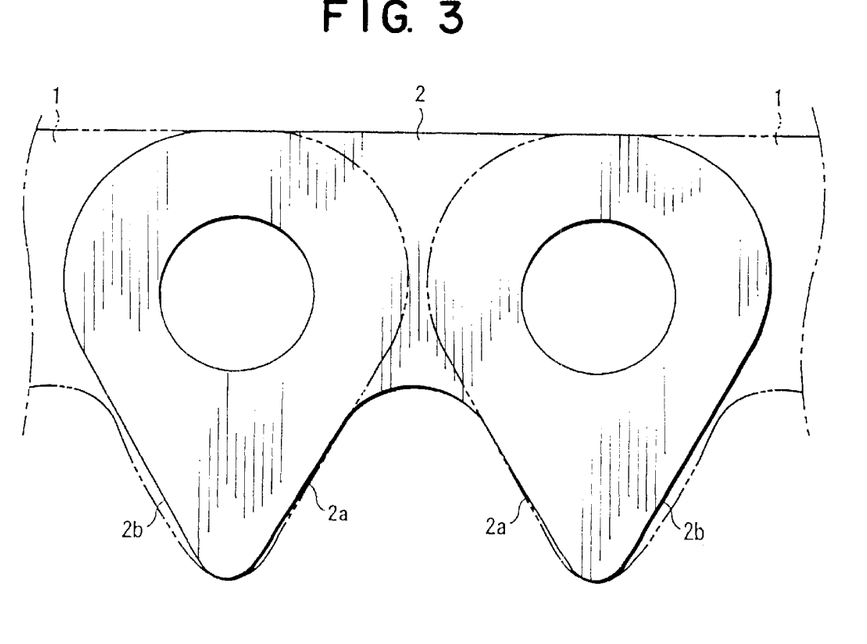
FIG. 3 is an enlarged view of a second link plate used in embodiment of FIG. 1.

In the random arrangement type silent chain shown in FIG. 1, the link plates 1 as shown in FIG. 2 and the second link plates 2 as shown in FIG. 3 are mixed in the longitudinal direction of the chain, and connected by connection pins, and at least one or more of the second link plates are randomly arranged before and after the first link plates.

Specifically, the silent chain of random arrangement type in this embodiment is one in which the link plates in each row extending in the direction chain width are the same, the mixture ratio of the first link plates to the total link plates is set to 33%, and the first link plates are randomly arranged so that two or more of the first link plates do not immediately succeed one another in the longitudinal direction of the chain.

In FIG. 2, the first link plate 1 having the crotched link teeth includes an inner crotch 1a that functions at the start of engagement with the sprocket teeth and an outer flank 1b that functions only when it engages with and sits on the sprocket teeth. The tooth shape of the inner crotch 1a is in an arcuate profile, expanded at the center in a convex shape when superposed on an outer flank 2b (described later) of the second link plate 2 when connected to a second link plate. The tooth shape of the outer flank 1b has a linear profile in which the tooth sits on the sprocket tooth while sliding smoothly and avoiding striking noise. The broken line in FIG. 2 shows an external profile in the case where the second link plate 2 is connected to, and superposed on, the first link plate 1.

As shown in FIG. 3, the second link plate 2 includes an inner crotch 2a that does not function at all in engagement with the sprocket teeth, and the outer flank 2b that functions when it engages with and sits on the sprocket teeth. The tooth shape of the inner crotch 2a has a profile such that it does not protrude beyond the outer flank 1b of the first link plate 1 when superposed thereon when the first and second link plates are connected. The tooth shape of the outer flank 2b has a linear profile such that the tooth sits on the sprocket tooth while sliding smoothly and avoiding striking noise. The broken line in FIG. 3 shows an external profile in the case where the first link plate 1 is connected to, and superposed on, the second link plate 2.

Figure 4:
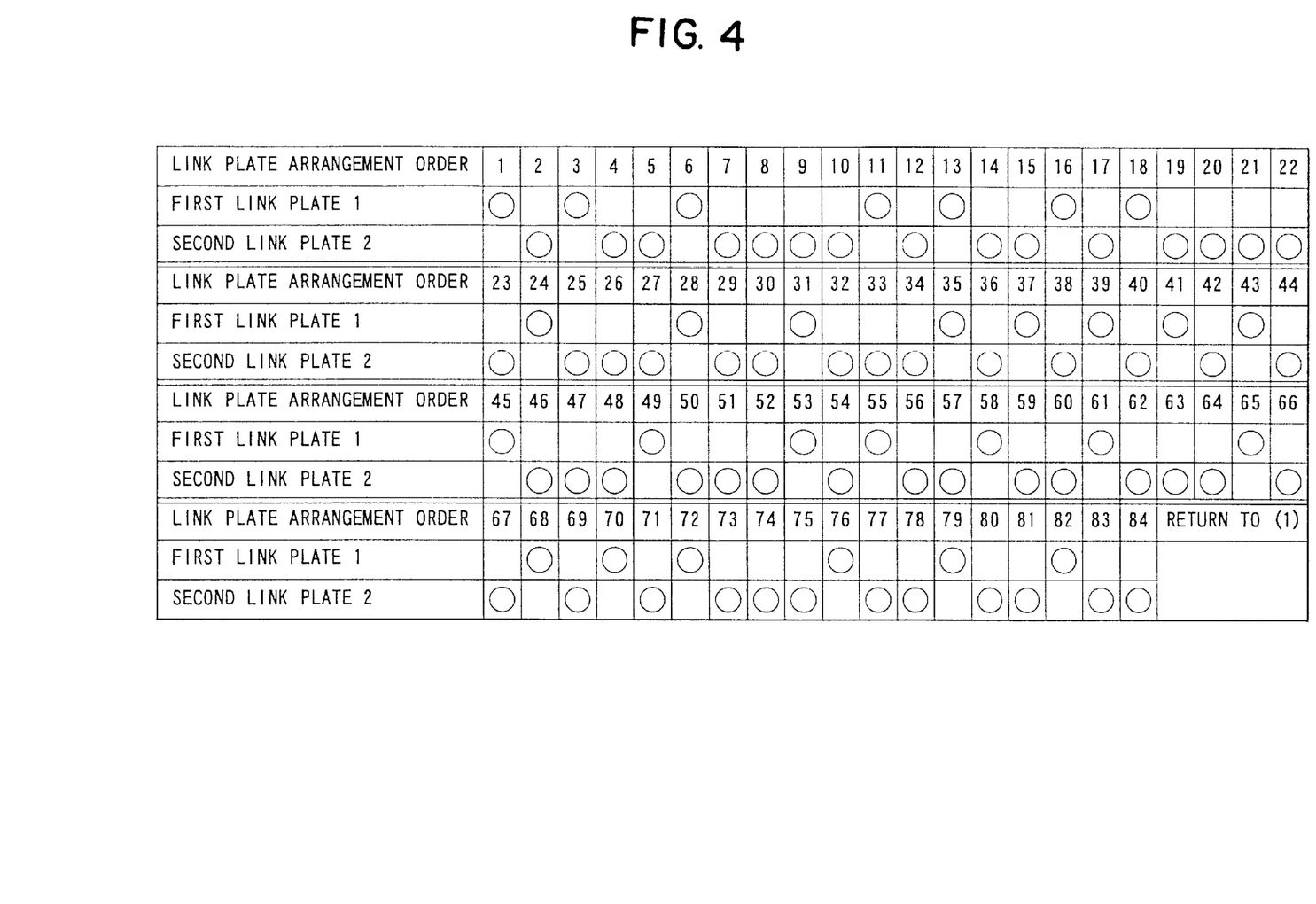
FIG. 4 is a table showing the combinations of the first link plates and the second link plates in the random arrangement type silent chain, in which a circle (o) shows the link plate to be combined.

The random arrangement type silent chain of this embodiment has the following engagement patterns in the case where the mixture ratio of the first link plates 1 to the total link plates is set to 33%, the first link plates 1 and the second link plates 2 are randomly arranged so that two or more of the first link plates 1 do not immediately succeed one another in the longitudinal direction of the chain, and the silent chain is engaged with sprockets having thirty-eight teeth as shown in FIGS. 1 and 4.

Figure 5:
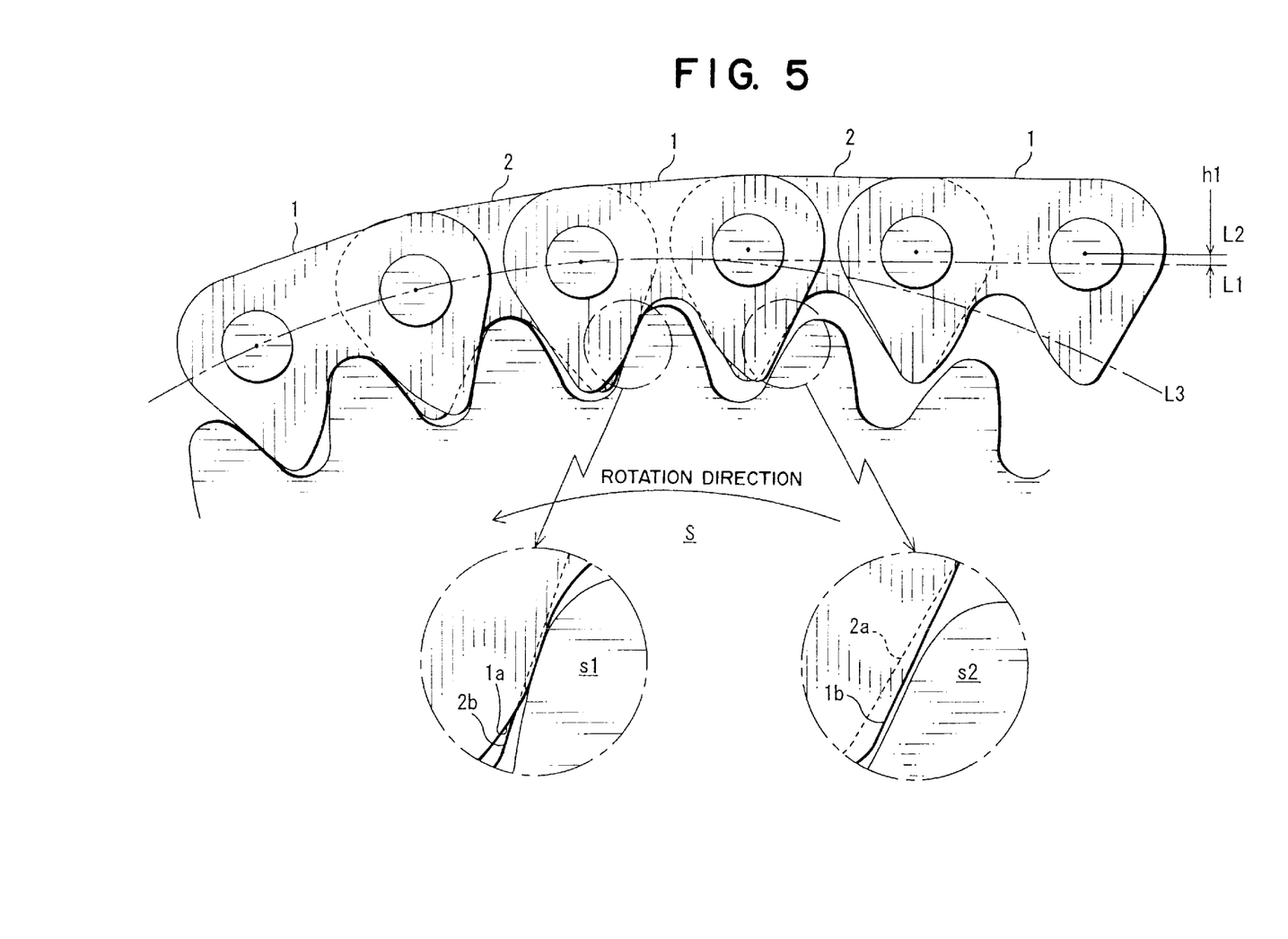
FIG. 5 is a fragmentary elevational view showing a first engagement pattern.

In a first engagement pattern A, the second link plate 2 approaches the sprocket after the first link plate 1, as shown in FIG. 5. The inner crotch 2a of the second link plate 2 (the fourth link plate from the left in FIG. 5) does not engage with the sprocket tooth s2 that follows the sprocket tooth s1 when the inner crotch 1a of the first link plate 1 (the third link plate from the left in FIG. 5) is engaged with the sprocket tooth s1. Accordingly, contact noise which would otherwise be caused by the inner crotch 2a of the second link plate 2 does not occur at all. Moreover, since the conventional run-upon phenomenon is restricted to a run-upon width of about h1 on the second link plate 2 and the outer flank 2b of the second link plate 2 is substantially restricted until it engages with the sprocket tooth s2 that follows the sprocket tooth s1, the engagement line does not deviate greatly from the sprocket pitch circle in the sprocket tooth head direction.

Figure 6:
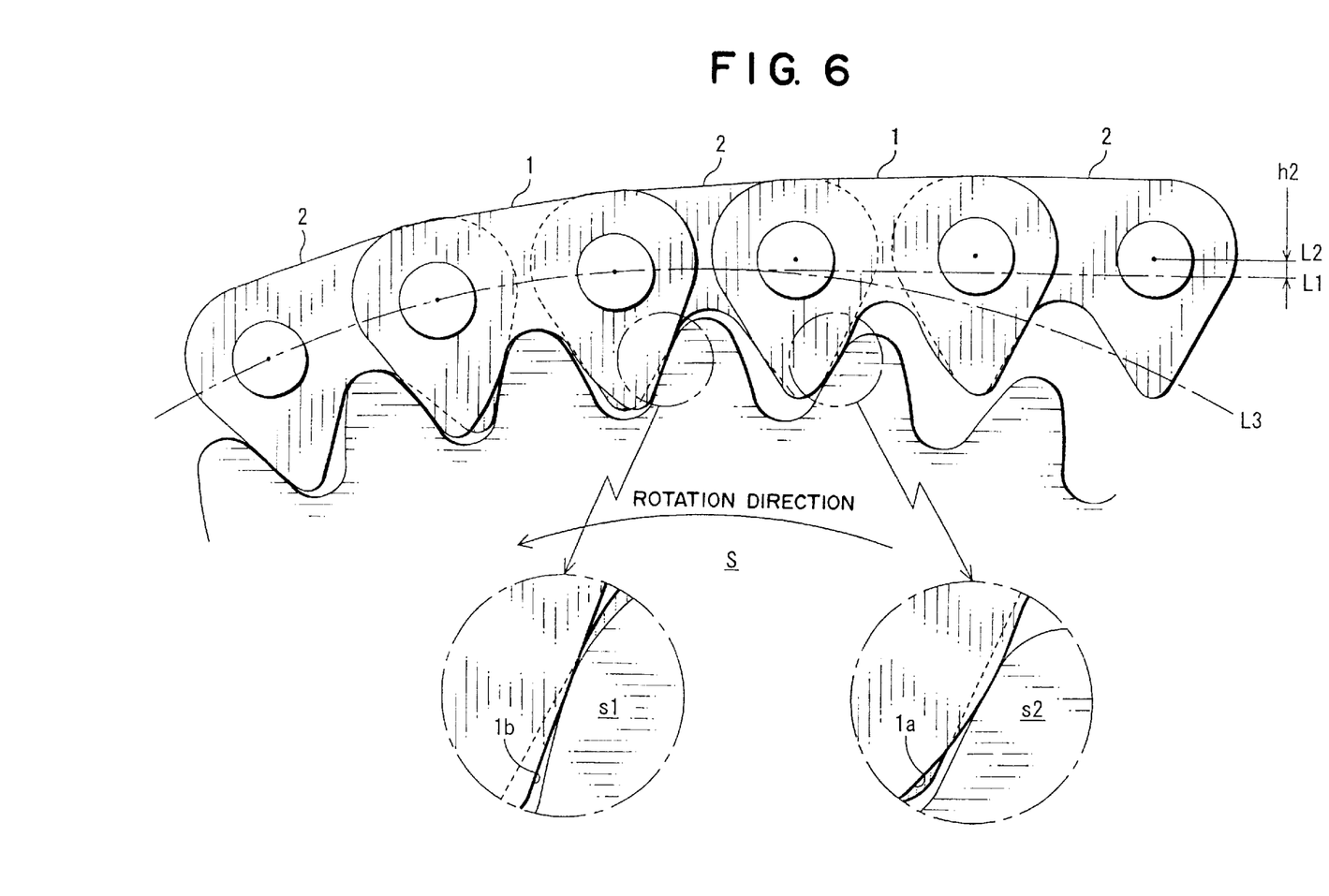
FIG. 6 is a fragmentary elevational view showing a second engagement pattern.

In a second engagement pattern B, as shown in FIG. 6, the outer flank 1b of a first link plate 1 (the second link plate from the left in FIG. 6) engages the sprocket tooth s1, and the second link plate 2 (the third link plate from the left in FIG. 6) that follows the first link plate 1 does not contact either the sprocket tooth s1 or the sprocket tooth s2. The inner crotch 1a of the fourth link plate from the left in FIG. 6, that follows the second link plate 2, engages the sprocket tooth s2 that follows the sprocket tooth s1, but no other inner crotch engages a tooth continuously and simultaneously. Accordingly, contact noise caused by another inner crotch does not occur at all. Moreover, since the conventional run-upon phenomenon is restricted to a run-upon width of about h2 on the second link plate 2, the engagement line does not deviate greatly from the sprocket pitch circle in the sprocket tooth head direction.

Figure 7:
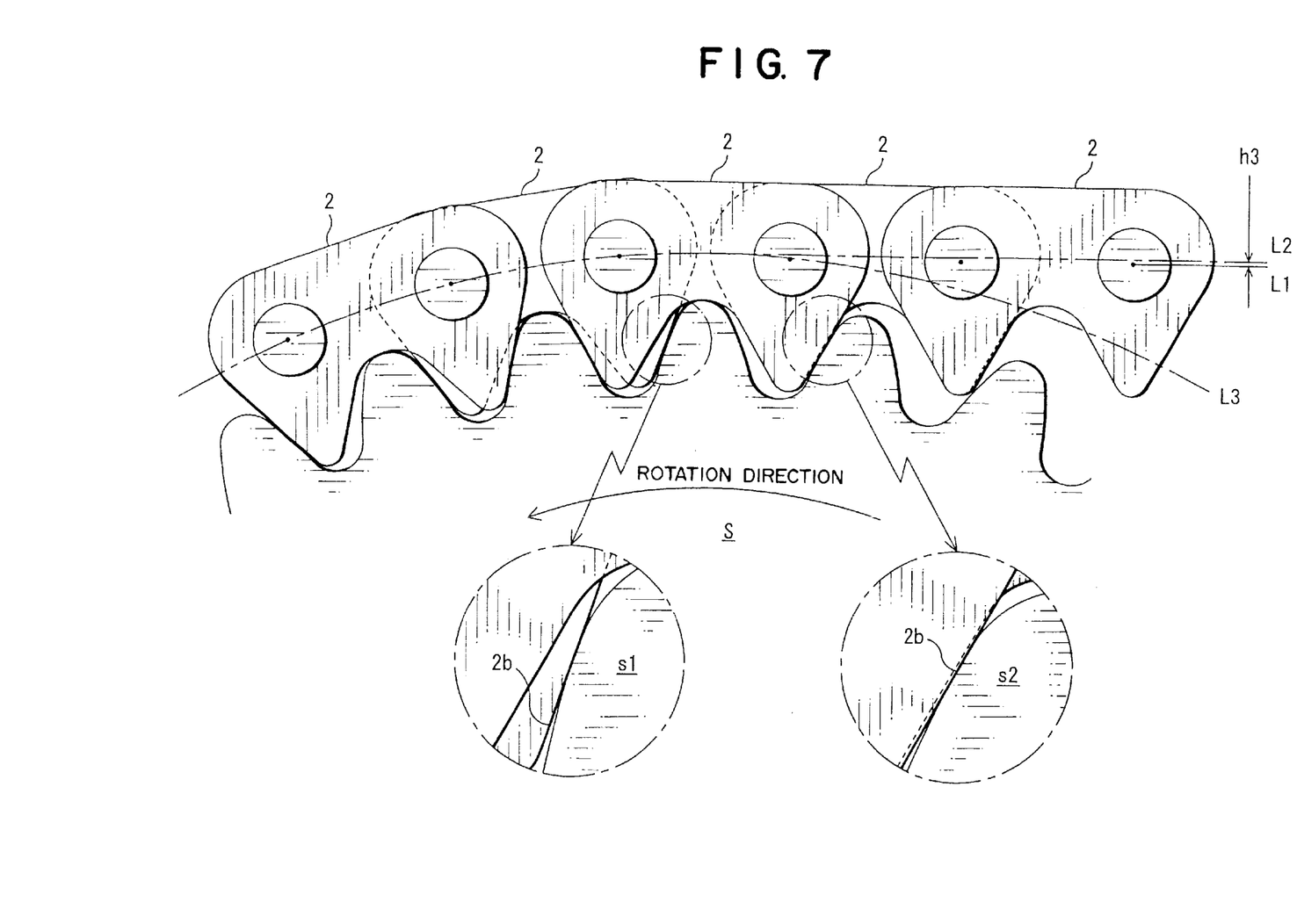
FIG. 7 is a fragmentary elevational view showing a third engagement pattern.

In a third engagement pattern C, a second link plate 2 engages with the sprocket after another second link plate 2 having the same shape. The outer flank 2b of the third link plate 2 from the left in FIG. 7 engages the sprocket tooth s2 that follows the sprocket tooth s1 when the outer flank 2b of the second link plate 2 from the left in FIG. 7 is engaged with the sprocket tooth s1. However, neither inner crotch 2a of the second link plates 2 engages with the sprocket teeth (s1, s2). Accordingly, contact noise caused by the inner crotch 2a of the second link plate does not occur at all. Moreover, since the conventional run-upon phenomenon is restricted almost completely to a run-upon width of about h3, the engagement line barely deviates from the sprocket pitch circle in the sprocket tooth head direction.

The random arrangement type silent chain of this embodiment forms one of the foregoing three engagement patterns if any part engages with the sprocket during power transmission, because the first link plates 1 and the second link plates 2 are mixed and combined endlessly in the longitudinal direction of the chain. Thus, the conventional run-upon phenomenon is restricted over the entire silent chain.

In the case where the random arrangement type silent chain of this embodiment is engaged with a sprocket having forty or more teeth, the link plates and the sprocket teeth produce an engagement pattern more complicated than the engagement patterns described above. However, even in the case of a more complicated engagement pattern, the inner crotches 1a of the first link plates 1 do not engage the sprocket continuously and simultaneously, and the conventional run-upon phenomenon is restricted over the entire silent chain.

Figure 8:
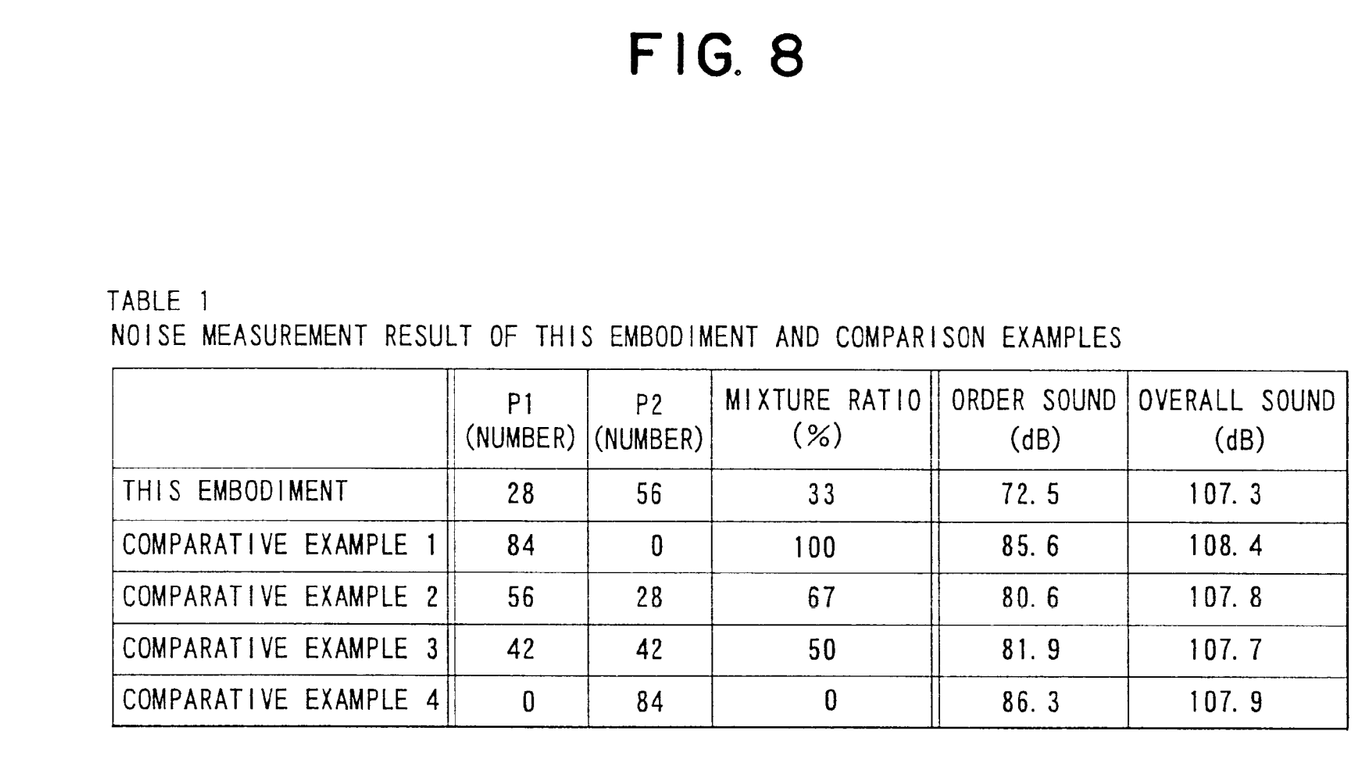
FIG. 8 is a table showing the results of noise measurements obtained with the chain in accordance with the embodiment of FIG. 1 and with comparative examples.

Table 1 of FIG. 8 shows the results of measurement of order sound, mainly caused by contact noise, and overall sound, mainly caused by vibration noise when the silent chain is engaged with a sprocket including regular, uniform sprocket teeth and operated in a range of 1450 to 1800 r.p.m. In the embodiment of FIG. 1, at least one or more of the second link plates 2 are randomly arranged and combined before and after the first link plates 1 in a mixture ratio at 33%. Comparative example 1 is a silent chain composed entirely of second link plates 2, combined continuously in the longitudinal direction of the chain. Thus the mixture ratio is 100%. Comparative example 2 is a silent chain in which at least one or more of the first link plates 1 are randomly arranged and combined before and after the second link plates 2 with a mixture ratio of 67%. Comparative example 3 is a silent chain in which the first link plates 1 and the second link plates 2, which are used in this embodiment, are alternately combined in the longitudinal direction, so that the mixture ratio is 50%. Comparative example 4 is a silent chain composed entirely of second link plates 2, so that the mixture ratio is 0%. Further, in these comparative examples each silent chain has the total of eighty-four links in the longitudinal direction and the number of link plates in the chain width direction is the same. The sprockets had thirty-five teeth. P1 in Table 1 denotes the number of the first link plates 1 arranged in the longitudinal direction of the chain, P2 denotes the number of the second link plates 2 arranged in a longitudinal direction of the chain, and the mixture ratio is P1/P1+P2, expressed as a percentage.

Table 1 of FIG. 8, shows that the order sound in the random arrangement type silent chain in accordance with the invention is 72.5 dB and the overall sound is 107.3 dB. Thus, the contact noise caused at the inner engagement surface 1a of the first link plate 1 and the vibration noise that is apt to occur as a result of too much play on the traveling line L2 of the free span of the chain, are reduced when compared to any of the comparative examples 1 to 4.

Moreover, with the random arrangement type silent chain of the invention, the run-upon phenomenon is restricted, and accordingly, the silent chain of the invention restricts abnormal elongation and excessive load during power transmission and the life of the silent chain is lengthened.

As described, in the operation of the random arrangement type silent chain of the invention, the inner crotches of the first link plates do not engage the sprocket teeth continuously and simultaneously, because the mixture ratio of the first link plates, which begin to engage with the sprocket teeth by the inner crotch and sit on the sprocket teeth by their outer flanks, to the total link plates is set to less than 50%. Accordingly, the contact noise caused at the inner engagement surface of the first link plates can be reduced.

Furthermore, according to the random arrangement type silent chain of the invention, the run-upon phenomenon, which occurs in the conventional silent chain, is restricted over the entire silent chain. The run-upon phenomenon is restricted because one or more of the second link plates that engage with and sit on the sprocket teeth only by their outer flanks are randomly arranged before and after the first link plates, which begins to engage with the sprocket teeth by their inner crotches and sit on the sprocket teeth by their outer flanks. Thus, slippage between the engagement line and the sprocket pitch circle becomes smaller, vibration noise of the free span of the chain extending between sprockets can be reduced, and abnormal elongation and excessive load during power transmission can be reduced, thereby remarkably lengthening the life of the silent chain life.

What is claimed is:

1. A random arrangement type silent chain, comprising:

a plurality of first link plates having teeth with outer flanks and an inner crotch, each of said first link plates being shaped so that it begins to engage with a sprocket tooth by engagement between the sprocket tooth and an inner crotch of the first link plate, and sits on the sprocket teeth by engagement of the sprocket teeth with outer flanks of the first link plate; and a plurality of second link plates having teeth with outer flanks, each of which second link plates engages with and sits on said sprocket teeth only by engagement of the sprocket teeth with the outer flanks of the second link plate, in which the first link plates and the second link plates are mixed and combined in the longitudinal direction to form an endless chain, wherein the mixture ratio of said first link plates to the total link plates is less than 50%, at least one or more of said second link plates is arranged both before and after each of said first link plates, the number of second link plates arranged before and after each first link plate varying randomly along the length of the chain, and the first link plates are shaped so that the inner crotches of the link plates of only one row of link plates of the chain are in engagement with a tooth of a given sprocket at any given instant of time, whereby the run-upon width, and the deviation between the engagement line and the sprocket pitch circle, are limited, and contact noise is minimized.

2. A random arrangement type silent chain according to claim 1 wherein the tooth surface of said inner crotch of each said first link plate is of a curved or arcuate shape, and the tooth surface of each said outer flank of each said first link plate is of a curved shape, a linear shape, or a combination of curved and linear shapes.

3. A random arrangement type silent chain according to claim 1 wherein each of said second link plates has an inner crotch and wherein the tooth surface of said inner crotch of each said second link plate is of a curved shape, an arcuate shape, a linear shape, or any combination of curved, arcuate or linear shapes, and the tooth surface of said outer flanks of said second link plate is or a linear shape, or a combination of curved and linear shapes.

4. A random arrangement type silent chain according to claim 1 wherein said first link plates and said second link plates include pin holes for insertion of connection pins or bushings for receiving connection pins, and including connection pins that connect said link plates to form an endless chain, said connection pins being round pins having a circular cross-section or a rocker joint type pins in which rolling back surfaces of a rocker pin and a joint pin face with each.

5. A chain drive comprising at least one sprocket having sprocket teeth, and a random arrangement type silent chain engaged with said sprocket teeth in driving relationship therewith, said chain comprising:

a plurality of first link plates having teeth with outer flanks and an inner crotch, each of said first link plates being shaped so that it begins to engage with a tooth of said sprocket by engagement between the sprocket tooth and an inner crotch of the first link plate, and sits on the sprocket teeth by engagement of the sprocket teeth with outer flanks of the first link plate; and a plurality of second link plates having teeth with outer flanks, each of which second link plates engages with and sits on said sprocket teeth only by engagement of the sprocket teeth with the outer flanks of the second link plate, in which the first link plates and the second link plates are mixed and combined in the longitudinal direction to form an endless chain, wherein the mixture ratio of said first link plates to the total link plates is less than 50%, at least one or more of said second link plates is arranged both before and after each of said first link plates, the number of second link plates arranged before and after each first link plate varying randomly along the length of the chain, and the first link plates are shaped so that the inner crotches of the link slates of only one row of link Plates of the chain are in engagement with a tooth of a given sprocket at any given instant of time, whereby the run-upon width, and the deviation between the engagement line and the sprocket pitch circle, are limited, and contact noise is minimized.

* * * * *